Patented Sept. 5, 1944

2,357,721

UNITED STATES PATENT OFFICE 2,357,721

GEL-COATED PIGMENTS AND PROCESS OF MAKING SAME

Benjamin Wilson Allan, Baltimore, Md.

No Drawing. Application March 10, 1942,
Serial No. 434,091

6 Claims. (Cl. 106—308)

This invention relates to pigments and has particular reference to pigments of improved dry hiding and resistance to weathering.

Pigments employed in paints and similar coatings have a tendency to chalk and fade badly on exposure to weathering influence and light. Also, when employed in interior paints or high temperature baking enamels, such pigments show a marked tendency toward yellowing or discoloration. These properties are very objectionable and adversely affect the useability of and market for such pigments.

In prior processes for treating pigment compositions, it has been the practice to prepare the treating agent separately and to carefully remove the soluble salts before adding the agent. Due to the adsorptive nature of pigments, it is difficult to remove such soluble salts despite prolonged washing. Nevertheless, regardless of the inconvenience and difficulties entailed, removal of the soluble salts is important because their presence in the pigment, except in only very small quantities, seriously and adversely affects the coating composition wherein the pigment has been used.

Among the objects of this invention is the production of a stable pigment of improved dry hiding power, possessing high resistance to weathering, chalking and discoloration and free of the foregoing objections. Such pigment, when used in casein vehicles or flat oil formulations, should yield a product having increased dry covering.

A further object of this invention is the provision of a process for making a pigment of such character.

A more specific object of this invention is the provision of a process whereby the pigment particles are coated with a protective inorganic gel which is substantially free from soluble salts, thereby avoiding the introduction of the objectionable soluble salts into the pigment during treatment.

A still further important specific object of this invention is the provision of a process whereby an inorganic gel, preferably a compound gel, is formed in situ upon the pigment particles under alkaline conditions.

Other, further and more specific objects of this invention will become readily apparent to persons skilled in the art from a consideration of the following description.

This invention is particularly applicable to certain white pigments, such as zinc sulfide, the composite pigments containing zinc sulfide, such as lithopone, titanium dioxide, mixtures of titanium dioxide with barium and calcium sulfate as well as zinc oxide and mixtures. Specific illustrations of my process are as follows:

Example I

To a liter of lithopone slurry, containing 700 grams lithopone per liter, is added 30 cc. of sodium silicate containing 185 grams of $SiO_2$ per liter. There is then added 34 cc. of sodium aluminate containing about 120 grams of $Al_2O_3$ per liter. The slurry becomes thin on the addition of the silicate. Approximately 5 minutes after the addition of the aluminate, the slurry sets to a gel. The slurry is then stirred, filtered, dried and ground. Stirring or agitation of the gel slurry loosens and liberates mechanically-held water.

Example II

To a liter of lithopone slurry, containing 700 grams lithopone per liter, is added 34 grams of sodium borate (borax) and the mixture is then heated to the boiling point. After complete solution of the borax, 50 cc. of concentrated sodium silicate containing 370 grams of $SiO_2$ per liter is added to the hot slurry. After approximately 10 minutes, the slurry sets to a firm gel-like consistency. The slurry is then agitated, filtered, dried and ground.

Example III

To a liter of titanium dioxide slurry, containing 600 grams of $TiO_2$ per liter, is added 45 cc. of sodium silicate containing 185 grams of $SiO_2$ per liter. There is then slowly added 51 cc. of sodium aluminate containing 120 grams of $Al_2O_3$ per liter. After about 5 minutes the slurry sets to a gel-like consistency. The slurry is then agitated, filtered, dried and milled in a pulverizing mill. If desired, the filtered material may be washed prior to drying.

Example IV

To a liter of ZnS slurry, containing 500 grams of ZnS per liter, is added 51 grams of sodium borate (borax) and the mixture is then heated to boiling. After the borax has completely dissolved, there is slowly added 75 cc. of concentrated sodium silicate containing 370 grams of $SiO_2$ per liter. After standing for approximately 10 minutes, the mixture sets to a firm gel. It is then agitated, filtered, dried and ground.

Example V

To a liter of a composite pigment, containing 600 grams per liter of a 3:1 barium sulfate titanium dioxide mixture, is added 45 cc. of sodium silicate solution containing 185 grams of $SiO_2$ per liter. The mixture is then well agitated, after which there is slowly added 51 cc. of potassium aluminate, (containing 120 grams of $Al_2O_3$ per liter). After approximately 5 minutes, the mixture sets to a firm gel. It is then agitated, filtered, dried and milled.

It will be seen from the foregoing examples that the inorganic compound gel is formed in situ upon the pigment particles under alkaline conditions, the hydrosol being allowed to set to a gel while in alkaline state. No soluble salts are formed in this process.

The pigments resulting from the processes of the foregoing examples possess improved hiding power and are strongly resistant to discoloration, particularly when used with metallic driers such as the lead driers.

Ordinarily, the amount of gel coating may vary from 0.5% to 10% by weight of the pigment treated. A heavier coating may be employed, but no particular advantage is derived from using more than 20% of gel coating.

The present invention is not limited to the specific details set forth in the foregoing examples which should be construed as illustrative and not by way of limitation, and in view of the numerous modifications which may be effective therein without departing from the spirit and scope of this invention, it is desired that only such limitations be imposed as are indicated in the appended claims.

I claim as my invention:

1. A pigment having its particles coated with a gel formed of a hydrosol which has been allowed to set, said hydrosol comprising the reaction products of an alkali metal silicate and a member of the group consisting of the aluminates and borates of the alkali metals.

2. In a process of treating pigments, dispersing a pigment in an inorganic alkaline, salt-free hydrosol consisting of the reaction products of an alkali metal silicate and a member of the group consisting of the aluminates and borates of the alkali metals, allowing the hydrosol to gel, filtering the gel and dispersed pigment, drying the filter cake and then comminuting same.

3. In a process of treating pigments, dispersing a pigment in an inorganic alkaline, salt-free hydrosol consisting of the reaction products of an alkali metal silicate and a member of the group consisting of the aluminates and borates of the alkali metals, allowing the hydrosol to gel, filtering the gel and dispersed pigment, washing and then drying the filter cake and then micro milling same.

4. In a process of treating pigments, dispersing a pigment in a solution of an alkali metal silicate, adding to said dispersion a member of the group consisting of the aluminates and borates of the alkali metals, allowing the resulting hydrosol to gel, filtering the gel and dispersed pigment, drying the filter cake and then comminuting same.

5. In a process of treating pigments, dispersing a pigment in a solution of an alkali metal silicate, adding to said dispersion a member of the group consisting of the aluminates and borates of the alkali metals, allowing the resulting hydrosol to gel, filtering the gel and dispersed pigment, washing and then drying the filter cake and then micro milling same.

6. In a process of treating pigments, dispersing a pigment in water glass, adding to said dispersion an aluminate of an alkali metal, allowing the resulting hydrosol to gel, filtering the gel and dispersed pigment, drying the filter cake and then comminuting same.

BENJAMIN WILSON ALLAN.